United States Patent
Li et al.

(10) Patent No.: US 10,055,310 B2
(45) Date of Patent: Aug. 21, 2018

(54) METHOD AND SYSTEM FOR DATA BACKUP

(71) Applicant: International Business Machines Corporation, Armonk, NY (US)

(72) Inventors: Ya J. Li, Beijing (CN); Yu M. Li, Beijing (CN); Michael G. Sisco, Vail, AZ (US); Yin X. Xiong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 14/471,183

(22) Filed: Aug. 28, 2014

(65) Prior Publication Data

US 2014/0372379 A1 Dec. 18, 2014

Related U.S. Application Data

(63) Continuation of application No. 13/909,370, filed on Jun. 4, 2013.

(30) Foreign Application Priority Data

Jul. 30, 2012 (CN) .......................... 2012 1 0266482

(51) Int. Cl.
*G06F 7/00* (2006.01)
*G06F 17/00* (2006.01)
(Continued)

(52) U.S. Cl.
CPC ...... *G06F 11/1469* (2013.01); *G06F 11/1451* (2013.01); *G06F 11/1453* (2013.01); *G06F 17/30303* (2013.01)

(58) Field of Classification Search
CPC ............. G06F 11/1451; G06F 11/1464; G06F 11/1469; G06F 11/1453; G06F 2201/84
(Continued)

(56) References Cited

U.S. PATENT DOCUMENTS 7,624,229 B1 * 11/2009 Longinov ........... G06F 12/0806
711/113
8,174,412 B2 5/2012 Reddy et al.
(Continued)

FOREIGN PATENT DOCUMENTS

| CN | 101216791 A | 7/2008 |
| CN | 101706825 A | 5/2010 |
| CN | 103577278 A | 2/2014 |

OTHER PUBLICATIONS

Bhagwat et al.; "Extreme Binning: Scalable, Parallel Deduplication for Chunk-based File Backup"; Proceedings of the 17th IEEE/ACM International Symposium on Modelling, Analysis and Simulation of Computer and Telecommunication Systems (MASCOTS '2009); London, UK; Sep. 2009; Copyright 2009 by IEEE.
(Continued)

*Primary Examiner* — Hosain Alam
*Assistant Examiner* — Nicholas Allen
(74) *Attorney, Agent, or Firm* — L. Jeffrey Kelly; Douglas M. Crockatt

(57) ABSTRACT

The present invention relates to a method, system, and computer program product for data backup, the method comprising: performing first chunking on current data by using the same chunking method as that used by original backup data to obtain a current chunk; calculating hash value of the current chunk; and acquiring, from a hash value table of the original backup data, an identifier of a matched chunk whose hash value is the same as the calculated hash value of the current chunk, and incrementing number of continuous matched chunks by one. Since the pertinence between original backup data and current data is maximally utilized, performance of de-duplication method can be efficiently improved.

10 Claims, 5 Drawing Sheets

(51) Int. Cl.
*G06F 11/14* (2006.01)
*G06F 17/30* (2006.01)

(58) Field of Classification Search
USPC .......................................................... 707/646
See application file for complete search history.

(56) References Cited

U.S. PATENT DOCUMENTS

| | | | | |
|---|---|---|---|---|
| 8,281,066 B1* | 10/2012 | Trimmer | ................ | G06F 3/0641 |
| | | | | 711/103 |
| 8,423,519 B2* | 4/2013 | Tofano | ............... | G06F 17/30159 |
| | | | | 707/692 |
| 8,442,942 B2* | 5/2013 | Leppard | ............ | G06F 17/30159 |
| | | | | 707/616 |
| 2005/0065926 A1* | 3/2005 | Chen | ................. | G06F 17/30454 |
| 2008/0133561 A1* | 6/2008 | Dubnicki | ............. | G06F 11/1453 |
| 2009/0182789 A1* | 7/2009 | Sandorfi | ............. | G06F 11/1004 |
| 2011/0119262 A1* | 5/2011 | Dexter | .............. | G06F 17/30864 |
| | | | | 707/726 |
| 2011/0196822 A1* | 8/2011 | Zunger | ............. | G06F 17/30575 |
| | | | | 707/609 |
| 2011/0225038 A1* | 9/2011 | Fontoura | ........... | G06F 17/30501 |
| | | | | 705/14.49 |
| 2011/0225385 A1* | 9/2011 | Tofano | ............. | G06F 17/30156 |
| | | | | 711/170 |
| 2011/0238635 A1 | 9/2011 | Leppard | | |
| 2011/0246741 A1* | 10/2011 | Raymond | ......... | G06F 17/30159 |
| | | | | 711/170 |
| 2011/0307659 A1* | 12/2011 | Hans | ..................... | G06F 3/0613 |
| | | | | 711/114 |
| 2012/0016882 A1* | 1/2012 | Tofano | ................... | H03M 7/30 |
| | | | | 707/747 |
| 2012/0041979 A1* | 2/2012 | Lee | ........................ | G06N 5/022 |
| | | | | 707/776 |
| 2012/0166448 A1* | 6/2012 | Li | ....................... | G06F 17/30097 |
| | | | | 707/747 |
| 2012/0221567 A1* | 8/2012 | Finkelstein | ............. | G06F 17/30 |
| | | | | 707/731 |
| 2012/0233135 A1* | 9/2012 | Tofano | ............. | G06F 17/30489 |
| | | | | 707/692 |
| 2012/0233417 A1* | 9/2012 | Kalach | ................ | G06F 11/1469 |
| | | | | 711/162 |
| 2012/0272008 A1* | 10/2012 | Tashiro | ............... | G06F 12/0866 |
| | | | | 711/129 |
| 2013/0054544 A1* | 2/2013 | Li | ....................... | G06F 11/1004 |
| | | | | 707/693 |
| 2013/0060739 A1* | 3/2013 | Kalach | ............. | G06F 17/30159 |
| | | | | 707/692 |
| 2013/0086006 A1* | 4/2013 | Colgrove | ............ | G06F 3/0688 |
| | | | | 707/692 |
| 2013/0086353 A1* | 4/2013 | Colgrove | ............ | G06F 3/0608 |
| | | | | 711/206 |
| 2013/0091170 A1* | 4/2013 | Zhang | .............. | G06Q 10/06313 |
| | | | | 707/783 |
| 2013/0097380 A1* | 4/2013 | Colgrove | .......... | G06F 17/30159 |
| | | | | 711/118 |
| 2013/0117516 A1* | 5/2013 | Sobolewski | ............ | G06F 12/16 |
| | | | | 711/162 |
| 2013/0138703 A1* | 5/2013 | Daynes | ............... | G06F 9/44521 |
| | | | | 707/813 |
| 2014/0032499 A1* | 1/2014 | Li | ....................... | G06F 11/1451 |
| | | | | 707/646 |

OTHER PUBLICATIONS

Lu et al.; "Frequency Based Chunking for Data De-Duplication"; Department of Computer Science and Engineering University of Minnesota; Minneapolis, Minnesota.

"Data deduplication"; Wikipedia; Printed May 31, 2013; <http://en.wikipedia.org/wiki/Data-deduplication>.

Pending U.S. Appl. No. 13/909,370, entitled "Method and System for Data Backup", filed Jun. 4, 2013.

* cited by examiner

METHOD AND SYSTEM FOR DATA BACKUP

CROSS REFERENCE

The present application is a continuation of and claims priority under 35 U.S.C. § 120 of U.S. patent application Ser. No. 13/909,370, filed on Jun. 4, 2013, which is incorporated by reference in its entirety.

TECHNICAL FIELD

The present invention relates to computer field, and more specifically, to a method and system for data backup.

BACKGROUND

Data backup is a procedure of preserving data in a certain form, such that when system is damaged or under other specific conditions, the data can be reused. Data backup is an important component in the field of storage, and its position and function in storage system can not be ignored. Further, for an IT system, backup task is also an indispensable component therein. This is because not only can it prevent damage due to accidental event, but also enable historical data to be saved and archived in an optimal way, that is, it provides possibility for conducting historical data query, statistics collection and analysis on historical data, and archiving and saving important information.

De-duplication technology can eliminate redundant data by deleting duplicated data in a data set and only preserving one piece thereof. Generally, since there is a large amount of duplicated data in original data, optimized data for storage can be obtained by using de-duplication technology. Storage space needed by optimized data for storage is significantly reduced. Currently, de-duplication technology is widely used in data backup and archive system, it can help an application program to reduce amount of data for storage, save network bandwidth, improve storage efficiency, thereby saving cost.

There are mainly two criteria for measuring de-duplication technology, that is de-duplication ratio and performance of executing de-duplication. The de-duplication ratio is determined by data's own feature and application schema, while performance of de-duplication depends on specific implementation technology. Current manufacturers have provided many de-duplication methods such as fixed length chunking method, non-fixed length chunking method etc, and in order to increase de-duplication ratio or performance of executing de-duplication, various manufacturers are continuously developing new de-duplication method and system.

SUMMARY

Illustrative embodiments of the invention provide a method and system for data backup which are capable of improving performance of executing de-duplication.

According to an embodiment of the present invention, there is provided a method for data backup, wherein, there is original backup data and current data to be backed up, the method comprising performing first chunking on the current data by using the same chunking method as that used by the original backup data to obtain a current chunk; calculating hash value of the current chunk; and acquiring, from a hash value table of the original backup data, an identifier of a matched chunk whose hash value is the same as the calculated hash value of the current chunk, and incrementing number of continuous matched chunks by one.

According to another embodiment of the present invention, there is provided a system for data backup, wherein, there is original backup data and current data to be backed up, the system comprising: a chunking unit configured to perform first chunking on the current data by using the same chunking method as that used by the original backup data to obtain a current chunk; a calculating unit configured to calculate hash value of the current chunk; and an acquiring unit configured to acquire, from a hash value table of the original backup data, an identifier of a matched chunk whose hash value is the same as the calculated hash value of the current chunk, and to increment number of continuous matched chunks by one.

According to an embodiment of the present invention, there is also provided a computer program product for data backup.

With the one or more above embodiments of the invention, since the relationship between original backup data and current data is maximally utilized, performance of de-duplication method can be efficiently improved, thereby improving performance of data backup.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
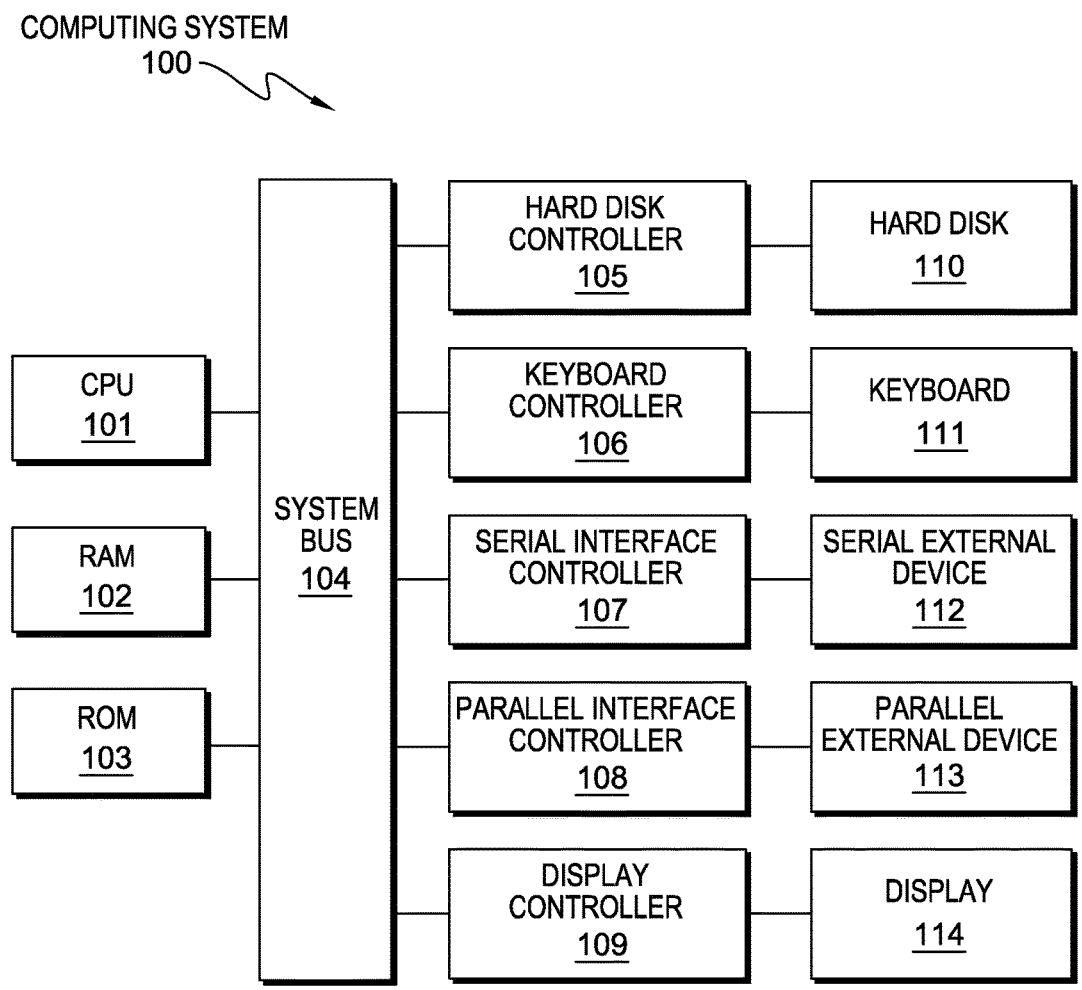
FIG. 1 shows a block diagram of an exemplary computer system 100 which is applicable to implement the embodiments of the present invention.

FIG. 1 shows an exemplary computing system 100 which is applicable to implement the embodiments of the present invention. As shown in FIG. 1, computing system 100 may include: CPU (Central Process Unit) 101, RAM (Random Access Memory) 102, ROM (Read Only Memory) 103, System Bus 104, Hard Disk Controller 105, Keyboard Controller 106, Serial Interface Controller 107, Parallel Interface Controller 108, Display Controller 109, Hard Disk 110, Keyboard 111, Serial External Equipment 112, Parallel External Device 113 and Display 114. Among above devices, CPU 101, RAM 102, ROM 103, Hard Disk Controller 105, Keyboard Controller 106, Serial Interface Controller 107, Parallel Interface Controller 108 and Display Controller 109 are coupled to the System Bus 104. Hard Disk 110 is coupled to Hard Disk Controller 105. Keyboard 111 is coupled to Keyboard Controller 106. Serial External Equipment 112 is coupled to Serial Interface Controller 107. Parallel External Equipment 113 is coupled to Parallel Interface Controller 108. And, Display 114 is coupled to Display Controller 109. It should be understood that the structure as shown in FIG. 1 is only for the exemplary purpose rather than any limitation to the present invention. In some cases, some devices may be added to or removed from computing system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM) 102, a read-only memory (ROM) 103, an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In a common de-duplication application scenario, typically, only a fraction of data files will be changed, that is, there is a huge similarity between continuous versions of backup data. Based on such an application scenario, according to the concept of the invention, prediction on data chunking is added when chunking data by using conventional de-duplication method, that is, matched data blocks are searched in original backup data. By searching matched data blocks and directly using original backup data to chunk the current data in case that number of continuous matched data blocks exceeds a certain threshold, time in chunking operation can be saved, thereby efficiently improving performance of executing de-duplication.

In a method for data backup according to an embodiment of the invention, there is original backup data $D_0$ and current data $D_1$ to be backed up. As stated above, in a common de-duplication scenario, there is a huge similarity between $D_0$ and $D_1$. Of course, here the description is made by merely taking the case that there is a large similarity between $D_0$ and $D_1$ for example, it should be appreciated that, application scope of the invention is not limited thereto. Next, a method 200 for data backup according to an embodiment of the invention will be further described in conjunction with FIGS. 2a-2c. Method 200 can be performed by, for example, a program executing on computer system 100 or by, for example, system 300 as shown in FIG. 3.

Figure 2A:
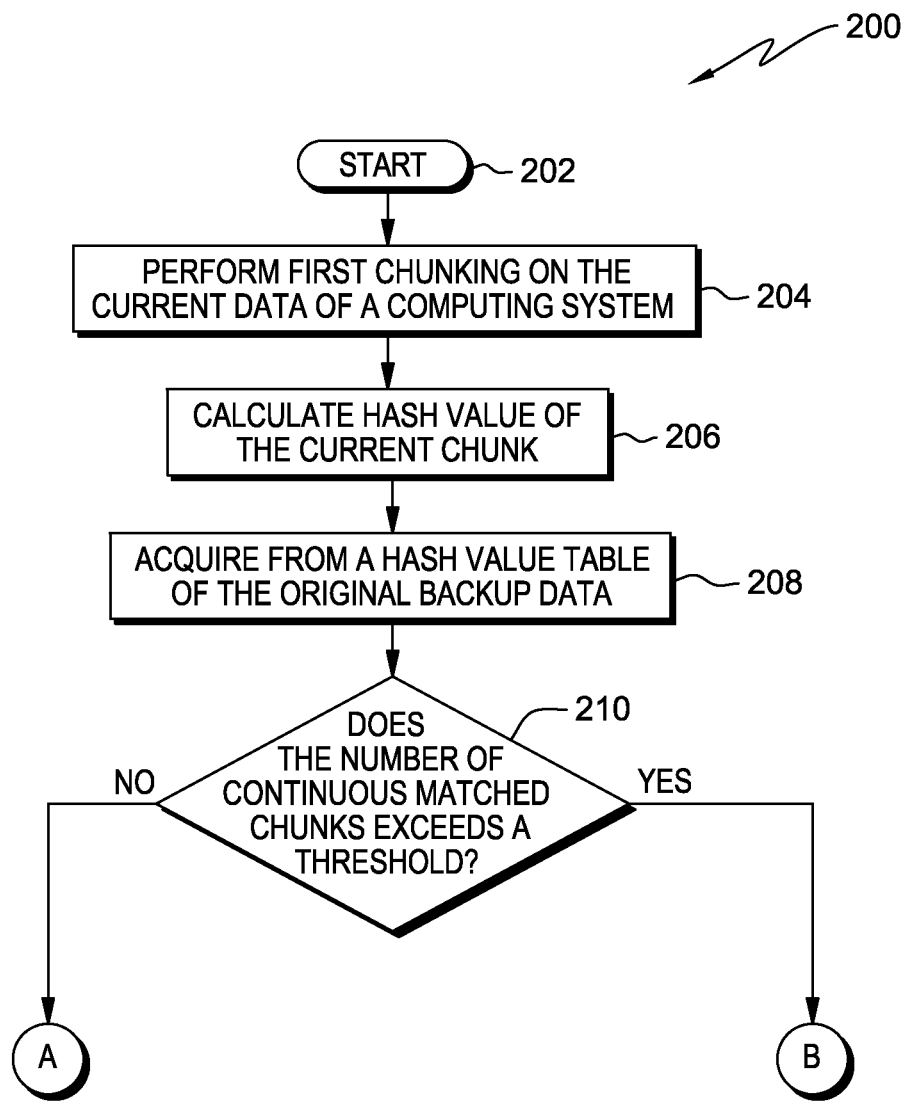
FIGS. 2a-2c show flowcharts of a method 200 for data backup according to one or more embodiments of the invention.
Figure 3:
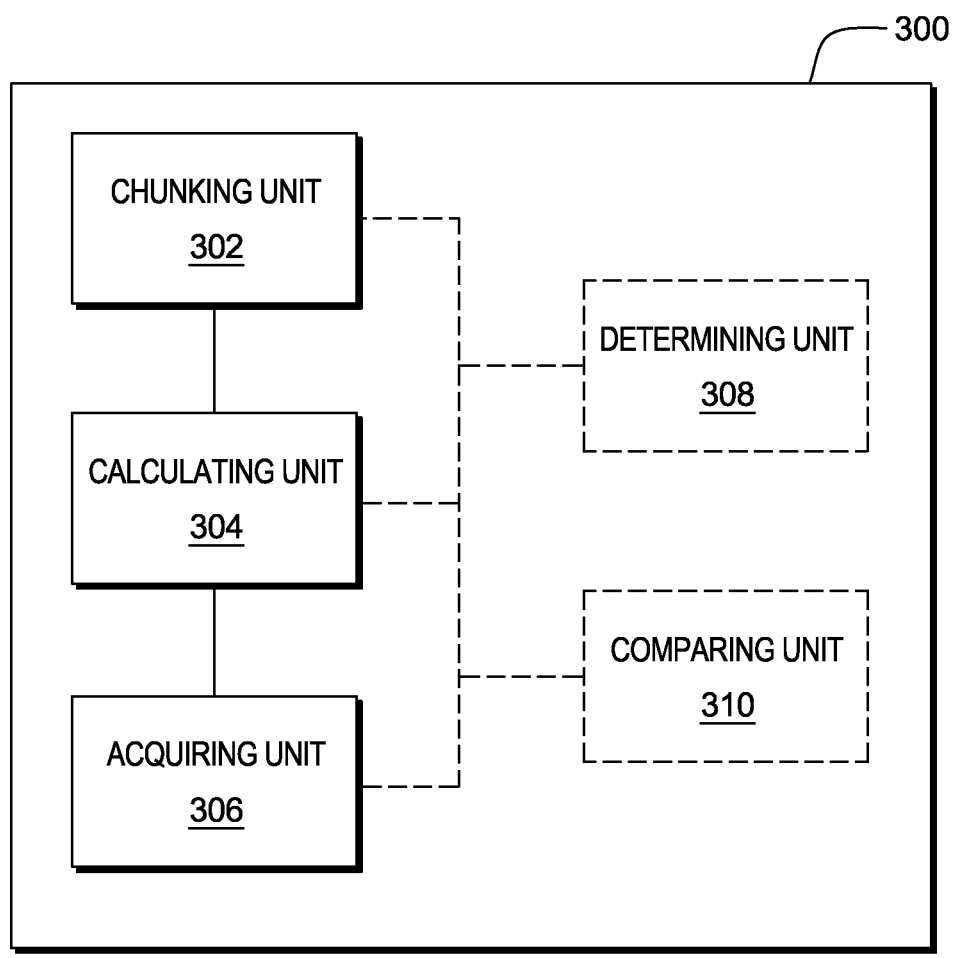
FIG. 3 shows a block diagram of a system 300 for data backup according to one or more embodiments of the invention.

Referring to FIG. 2a, a flowchart of a method 200 for data backup according to an embodiment of the invention is shown. The method 200 starts with step 202.

Next, the method 200 proceeds to step 204: performing first chunking on the current data by using the same chunking method as that used by the original backup data to obtain a current chunk. Assume what is used by the original backup data $D_0$ is Content Defined Chunking (CDC), then the same chunking method is used to perform first chunking on the current data $D_1$ to be backed up, and data block obtained after first chunking is taken as current chunk $C_1$.

Next, the method 200 proceeds to step 206: calculating hash value of the current chunk. Any method in the art may be utilized to calculate hash value $H_1$ of the current chunk $C_1$, which will be omitted here for brevity.

Next, the method 200 proceeds to step 208: acquiring, from a hash value table of the original backup data, an identifier of a matched chunk whose hash value is the same as the calculated hash value of the current chunk, and incrementing number of continuous matched chunks by one. The hash value table records therein identifier and hash value of each data block of backup data. According to an embodiment of the invention, hash value $H_1$ of current chunk $C_1$ is used to search in the hash value table $T_1$ of original backup data $D_0$ for a data block with same hash value $H_1$ to be taken as matched block $M_1$, thereby acquiring identifier of the matched block $M_1$. Here, a variable $C_M$ (its initial value is zero) is preset to record number of continuous matched blocks to be used in subsequent procedure. After a data block with same hash value $H_1$ is found in the hash value table $T_1$ of original backup data $D_0$ by using hash value $H_1$ of current chunk $C_1$, the number of continuous matched blocks, i.e. value of $C_M$, is incremented by one.

By using the chunking method employed by original backup data to perform chunking on current data to be backed up and searching matched chunks from original backup data, original backup data and current data may be compared via manner of chunking, and in contrast to the method in prior art, it can improve performance of executing de-duplication and further enhance performance of data backup.

Figure 2B:
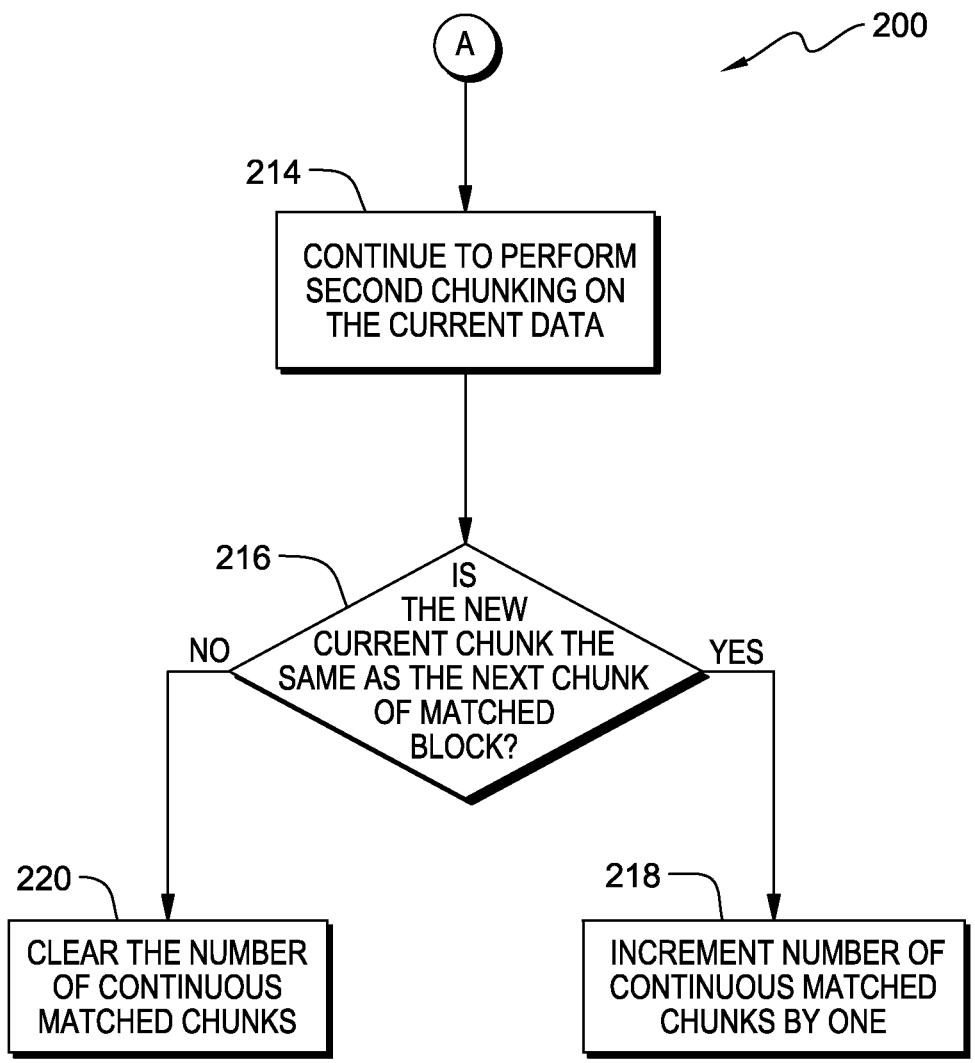
Figure 2C:
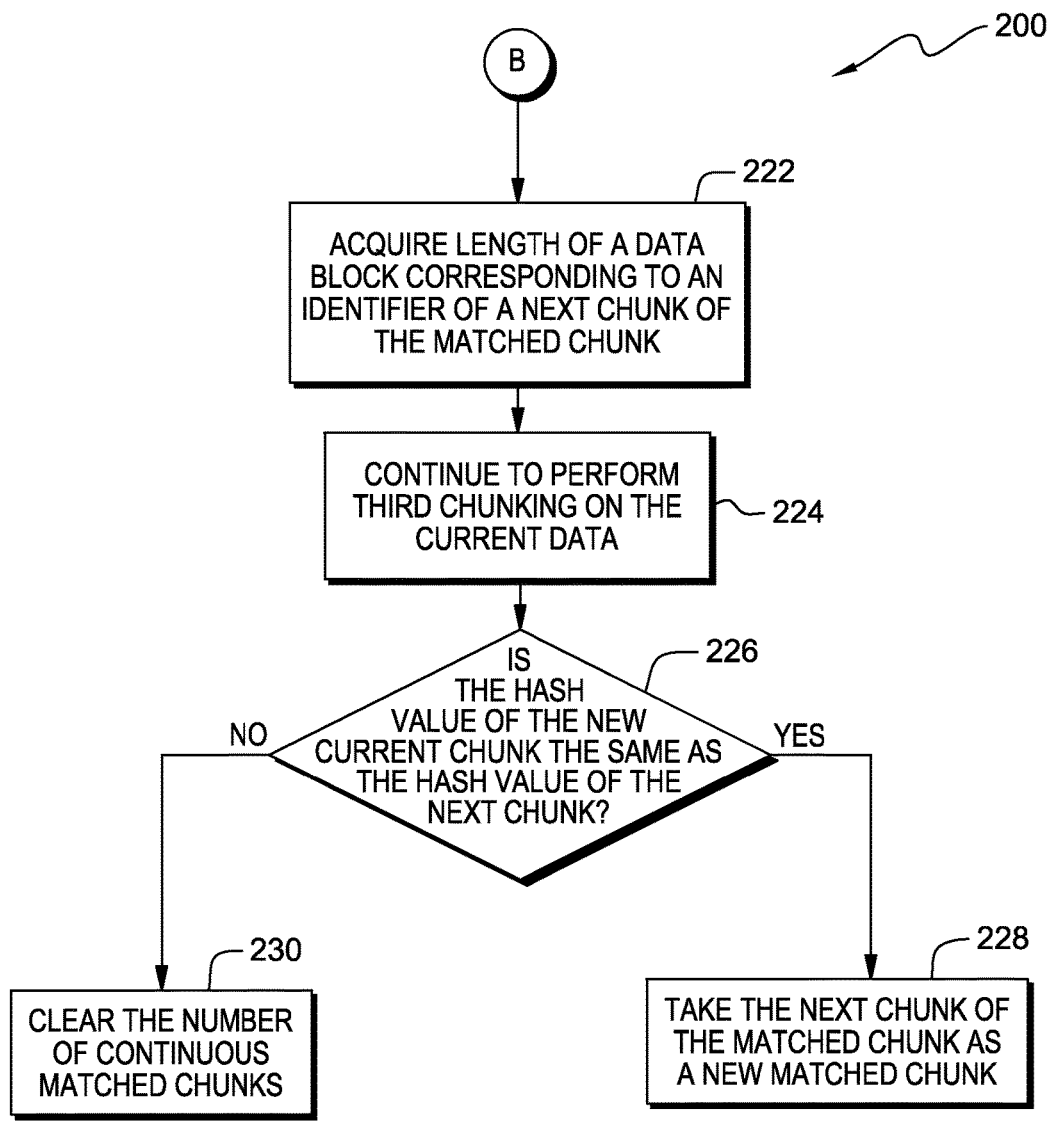

The method 200 for data backup according to one or more additional embodiments of the invention will be described below in conjunction with FIGS. 2a-2c. In FIGS. 2a-2c, dashed line blocks are used to represent steps related to these other embodiments.

Continue to refer to FIG. 2a, according to an embodiment of the invention, after acquiring, from a hash value table of the original backup data, an identifier of a matched chunk whose hash value is the same as the calculated hash value of the current chunk and incrementing number of continuous matched chunks by one, the method 200 proceeds to step 210: determining whether the number of continuous matched chunks exceeds a threshold. Here, the threshold is a preset value. If the number of continuous matched chunks (CM) exceeds that preset threshold, then it is considered that, data block following current chunk of current data $D_1$ to be backed up is the same as that following the matched block in the original backup data $D_0$.

Next, in response to the number of continuous matched chunks not exceeding the threshold, the method 200 proceeds to step 214 (FIG. 2b): continuing to perform second chunking on the current data by using the same chunking method as that used by the original backup data to obtain a new current chunk; and calculating hash value of the new current chunk. Assume what is used by original backup data $D_0$ is Content Defined Chunking (CDC), then the same chunking method is employed to continue to perform second chunking on the portion of current data $D_1$ to be backed up remained after first chunking, and the resulting data block obtained via second chunking is taken as a new current chunk $C_2$. Then, hash value $H_2$ of the new current chunk $C_2$ is calculated.

According to an embodiment of the invention, the method 200 further comprises: in response to calculating hash value $H_2$ of new current chunk $C_2$, it proceeds to step 216 (FIG. 2b): acquiring hash value of a next chunk of the matched chunk from the hash value table of the original backup data; and determine whether the hash value of the new current chunk and the hash value of the next chunk of the matched chunk are equal. Here, it is determined, by acquiring hash value of next chunk $M_2$ of matched chunk $M_1$ from hash value table $T_1$ of the original backup data $D_0$ and comparing it with the hash value of the new current chunk $C_2$, whether the new current chunk $C_2$ is the same as the next chunk $M_2$ of matched block $M_1$.

Next, in response to the hash value of the new current chunk being the same as the hash value of the next chunk of the matched chunk, the method 200 proceeds to step 218 (FIG. 2b): incrementing number of continuous matched chunks by one; taking the next chunk of the matched chunk as a new matched chunk; and returning to the step of determining whether the number of continuous matched chunks exceeds a threshold (step 210). Here, if the hash value of the new current chunk $C_2$ is the same as the hash value of next chunk $M_2$ of the matched chunk $M_1$, then it indicates that, the new current chunk $C_2$ is also matched with next chunk $M_2$ of the matched chunk $M_1$. Thus, the number of continuous matched chunks, i.e. value of variable $C_M$, is incremented by one, and the next chunk $M_2$ of the matched chunk $M_1$ is taken as a new matched chunk $M_1'$, then the method returns to the step of determining whether the number $C_M$ of continuous matched chunks exceeds a threshold.

According to an embodiment of the invention, in response to the hash value of the new current chunk being different from the hash value of the next chunk of the matched chunk, the method 200 proceeds to step 220 (FIG. 2b): clearing the number of continuous matched chunks; returning to the step of acquiring, from a hash value table of the original backup data, an identifier of a matched chunk whose hash value is the same as the calculated hash value of the current chunk (step 208). If the hash value of the new current chunk $C_2$ is different from the hash value of the next chunk $M_2$ of the matched chunk $M_1$, then it indicates that, the new current chunk $C_2$ is not matched with the next chunk $M_2$ of the matched chunk $M_1$, that is, there is a need to re-find an identifier of a matched chunk $M_1'$ whose hash value is the same as the calculated hash value of the current chunk $C_2$ from the original backup data $D_0$, and clear the number of continuous matched chunks to restart counting.

According to an embodiment of the invention, after acquiring, from a hash value table of the original backup data, an identifier of a matched chunk whose hash value is the same as the calculated hash value of the current chunk and incrementing the number of continuous matched chunks by one, the method 200 proceeds to step 210: determining whether the number of continuous matched chunks exceeds a threshold.

Next, in response to the number of continuous matched chunks exceeding the threshold, the method 200 proceeds to step 222 (FIG. 2c): acquiring length of a data block corresponding to an identifier of a next chunk of the matched chunk.

Next, according to an embodiment of the invention, the method 200 proceeds to step 224 (FIG. 2c): continuing to perform third chunking on the current data by using the acquired length of a data block corresponding to an identifier of a next chunk of the matched chunk to obtain a new current chunk; calculating hash value of the new current chunk; acquiring hash value of the next chunk of the matched chunk from a hash value table of the original backup data. According to definition of the threshold, if the number of continuous matched chunks exceeds the threshold, then it is considered that, data block following current chunk (corresponding to current chunk $C_T$ of current data $D_1$ when number of continuous matched chunks exceeds the threshold) of current data $D_1$ to be backed up is the same as that following matched block (corresponding to matched chunk $M_T$ of original backup data $D_0$ when number of continuous matched chunks exceeds the threshold) of original backup data $D_0$. Thus, length of the data block of original backup data $D_0$ may be utilized to perform chunking on current data. That is, by acquiring identifier of the next chunk $M_{T+1}$ of the matched chunk $M_T$ from hash value table $T_1$ of the original backup data $D_0$, and further acquiring length of a data block corresponding to the identifier of the next chunk $M_{T+1}$ of the matched chunk $M_T$, and in turn utilizing the acquired length of the data block corresponding to the identifier of the next chunk $M_{T+1}$ of the matched chunk $M_T$ to perform third chunking on the portion of current data remained after first chunking and second chunking, a new current chunk $C_3$ is obtained. Meanwhile, in order to ensure the new current chunk $C_3$ obtained through third chunking is the same as the data block following the matched block $M_T$ in original backup data $D_0$, there is a need to re-calculate hash value $H_3$ of the new current chunk $C_3$, and to compare its hash value $H_3$ with that of the next chunk $M_{T+1}$ of the matched chunk $M_T$ so as to perform verification.

Next, according to an embodiment of the invention, the method 200 proceeds to step 226 (FIG. 2c): determine whether the hash value of the new current chunk and the hash value of the next chunk of the matched chunk are equal. In response to the hash value of the new current chunk being the same as the hash value of the next chunk of the matched chunk, the method 200 proceeds to step 228 (FIG. 2c), wherein, taking the next chunk of the matched chunk as a new matched chunk; returning to the step of acquiring length of a data block corresponding to an identifier of the next chunk of the matched chunk. In response to the hash value of the new current chunk being different from the hash value of the next chunk of the matched chunk, the method 200 proceeds to step 230 (FIG. 2c): clearing the number of continuous matched chunks, returning to the step of acquiring, from a hash value table of the original backup data, an identifier of a matched chunk whose hash value is the same as the calculated hash value of the current chunk.

As stated above, in order to ensure that the new current chunk $C_3$ obtained through third chunking is the same as the data block following the matched block $M_T$ in original backup data $D_0$, there is a need to re-calculate hash value $H_3$ of current chunk $C_3$, and to compare its hash value $H_3$ with that of the next chunk $M_{T+1}$ of the matched chunk $M_T$ so as to perform verification. If hash value $H_3$ of the current chunk $C_3$ is the same as hash value of the next chunk $M_{T+1}$ of the matched chunk $M_T$, then it indicates that, the new current chunk $C_3$ is also matched with the next chunk $M_{T+1}$ of the matched chunk $M_T$. Thus, the next chunk $M_{T+1}$ of the matched chunk $M_T$ is taken as a new matched chunk $M_T'$, and return to the step of acquiring an identifier of a next chunk of the matched chunk from hash value table $T_1$ of original backup data $D_0$ (step 222). If hash value $H_3$ of the current chunk $C_3$ is different from that of the next chunk $M_{T+1}$ of the matched chunk $M_T$, then it indicates that, the new current chunk $C_3$ is not matched with the next chunk $M_{T+1}$ of the matched chunk $M_T$, that is, there is a need to re-find an identifier of a matched chunk $M_1'$ whose hash value is the same as the calculated hash value of the current chunk $C_3$ from the original backup data $D_0$, and clear the number of continuous matched chunks to restart counting.

One or more embodiments of the invention have been described above in detail in conjunction with FIGS. 2a-2c. It should be appreciated that, the above description is merely for purpose of illustration, and should not be construed as a limitation to the scope claimed by the invention.

Next, a system 300 for data backup according to one or more embodiments of the invention will be described in conjunction with FIG. 3. In FIG. 3, dashed line blocks represent optional structures of the system related to one or more other embodiments of the invention.

As shown in FIG. 3, system 300 for data backup according to an embodiment of the invention comprises: a chunking unit 302 configured to perform first chunking on the current data by using the same chunking method as that used by the original backup data to obtain a current chunk; a calculating unit 304 configured to calculate hash value of the current chunk; and an acquiring unit 306 configured to acquire, from a hash value table of the original backup data, an identifier of a matched chunk whose hash value is the same as the calculated hash value of the current chunk, and to increment number of continuous matched chunks by one.

According to an embodiment of the invention, system 300 for data backup further comprises: a determining unit 308 configured to determine whether the number of continuous matched chunks exceeds a threshold, and in response to not exceeding the threshold, the chunking unit 302 is further configured to continue to perform second chunking on the current data by using the same chunking method as that used by the original backup data to obtain a new current chunk; the calculating unit 304 is further configured to calculate hash value of the new current chunk.

According to an embodiment of the invention, system 300 for data backup further comprises: the acquiring unit 306 further configured to acquire hash value of a next chunk of the matched chunk from the hash value table of the original backup data; a comparing unit 310 configured to compare the hash value of the new current chunk with the hash value of the next chunk of the matched chunk, and in response to the hash value of the new current chunk being the same as the hash value of the next chunk of the matched chunk, system 300 is further configured to increment number of continuous matched chunks by one; take the next chunk of the matched chunk as a new matched chunk; return to determine whether the number of continuous matched chunks exceeds a threshold. In response to the hash value of the new current chunk being different from the hash value of the next chunk of the matched chunk, system 300 is further configured to clear the number of continuous matched chunks; return to acquire, from a hash value table of the original backup data, an identifier of a matched chunk whose hash value is the same as the calculated hash value of the current chunk.

According to an embodiment of the invention, system 300 for data backup further comprises a determining unit 308 configured to determine whether the number of continuous matched chunks exceeds a threshold, and in response to exceeding the threshold; the acquiring unit 306 is further configured to acquire length of a data block corresponding to an identifier of a next chunk of the matched chunk.

According to an embodiment of the invention, system 300 for data backup further comprises the chunking unit 302 further configured to continue to perform third chunking on the current data by using the acquired length of a data block corresponding to an identifier of a next chunk of the matched chunk to obtain a new current chunk; the calculating unit 304 is further configured to calculate hash value of the new current chunk; the acquiring unit 306 is further configured to acquire hash value of the next chunk of the matched chunk from a hash value table of the original backup data; the comparing unit 310 is further configured to compare the hash value of the new current chunk with the hash value of the next chunk of the matched chunk, and in response to the hash value of the new current chunk being the same as the hash value of the next chunk of the matched chunk, system 300 is further configured to take the next chunk of the matched chunk as a new matched chunk; return to acquire an identifier of the next chunk of the matched chunk from a hash value table of the original backup data; in response to the hash value of the new current chunk being different from the hash value of the next chunk of the matched chunk, system 300 is further configured to clear the number of continuous matched chunks; return to acquire, from a hash value table of the original backup data, an identifier of a matched chunk whose hash value is the same as the calculated hash value of the current chunk.

The flowchart and block diagrams in the Figs. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the Figs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for data backup, the system comprising:

one or more processors, one or more computer-readable memories, one or more computer-readable tangible storage devices, and program instructions stored on at least one of the one or more storage devices for execution by at least one of the one or more processors via at least one of the one or more memories, the program instructions, when executed by the at least one of the one or more of the processors, cause the at least one of the one or more of the processors to perform a method comprising:

receiving, from one of the one or more computer-readable tangible storage devices, original backup data;

receiving, from one of the one or more computer-readable tangible storage devices, current backup data;

performing first chunking on the current data by using the same chunking method as that used on the original backup data to obtain a current chunk, wherein the original backup data is a chunking data that is defined by content;

calculating a hash value of the current chunk, wherein a determination of whether a number of continuous matched chunks exceeds a threshold is determined, based on the calculated hash value, and wherein the threshold is a preset value, if a number of continuous matched chunks exceeds the preset threshold, a time for chunking the data is saved, and, wherein, then data blocks of the current chunk of data is equal to a matched block of the original backup data;

in response to a number of continuous matched chunks exceeding the threshold, the length of a data block that corresponds to an identifier of a next chunk of the matched chunk is acquired;

acquiring from a hash value table of the original backup data, an identifier of a matched chunk whose hash value is the same as the calculated hash value of the current chunk, and incrementing a number of continuous matched chunks, based on the exceeded threshold; and clearing the number of continuous matched chunks, whereby, the hash value table of the original backup data, and the identifier of a matched chunk whose hash value is the same as the calculated hash value of the current chunk are returned in response to the number of continuous matched chunks exceeding the threshold; and backing up remaining data after clearing the continuous matched chunks to one of the one or more computer-readable tangible storage devices.

2. The computer system according to claim 1, further comprising:

in response to not exceeding the threshold, continuing to perform second chunking on the current data by using the same chunking method as that used by the original backup data to obtain a new current chunk data; and calculating a hash value of the new current chunk.

3. The computer system according to claim 2, further comprising:

acquiring a hash value of a next chunk of the matched chunk from the hash value table of the original backup data;

comparing the hash value of the new current chunk with the hash value of the next chunk of the matched chunk;

in response to the hash value of the new current chunk being the same as the hash value of the next chunk of the matched chunk:

incrementing a number of continuous matched chunks;

taking the next chunk of the matched chunk as a new matched chunk; and returning to the step of determining whether the number of continuous matched chunks exceeds a threshold;

in response to the hash value of the new current chunk being different from the hash value of the next chunk of the matched chunk:
  clearing the number of continuous matched chunks; and
  returning to the step of acquiring, from the hash value table of the original backup data, an identifier of a matched chunk whose hash value is the same as the calculated hash value of the current chunk.

4. The computer system according to claim 1, further comprising:
  determining whether the number of continuous matched chunks exceeds a threshold, and in response to exceeding the threshold, acquiring a length of a data block corresponding to an identifier of a next chunk of the matched chunk.

5. The method according to claim 4, further comprising:
  continuing to perform a third chunking on the current data by using the acquired length of a data block corresponding to an identifier of a next chunk of the matched chunk to obtain a new current chunk;
  calculating a hash value of the new current chunk;
  acquiring a hash value of the next chunk of the matched chunk from the hash value table of the original backup data;
  comparing the hash value of the new current chunk with the hash value of the next chunk of the matched chunk;
  in response to the hash value of the new current chunk being the same as the hash value of the next chunk of the matched chunk:
    taking the next chunk of the matched chunk as a new matched chunk; and
    returning to the step of acquiring an identifier of the next chunk of the matched chunk from a hash value table of the original backup data;
  in response to the hash value of the new current chunk being different from the hash value of the next chunk of the matched chunk:
    clearing the number of continuous matched chunks; and
    returning to the step of acquiring, from a hash value table of the original backup data, an identifier of a matched chunk whose hash value is the same as the calculated hash value of the current chunk.

6. A computer program product for data backup, computer program product comprising:
  one or more non-transitory computer-readable tangible storage devices and program instructions stored on at least one of the one or more non-transitory computer-readable tangible storage devices, the program instructions executable to perform a method comprising:
  receiving, from one of the one or more computer-readable tangible storage devices, original backup data;
  receiving, from one of the one or more computer-readable tangible storage devices, current backup data;
  performing first chunking on the current data by using the same chunking method as that used on the original backup data to obtain a current chunk, wherein the original backup data is a chunking data that is defined by content;
  calculating a hash value of the current chunk, wherein a determination of whether a number of continuous matched chunks exceeds a threshold is determined, based on the calculated the hash value, and wherein the threshold is a preset value, if a number of continuous matched chunks exceeds the preset threshold, a time for chunking the data is saved, and, wherein, then data blocks of the current chunk of data is equal to a matched block of the original backup data;
  in response to a number of continuous matched chunks exceeding the threshold, the length of a data block that corresponds to an identifier of a next chunk of the matched chunk is acquired;
  acquiring from a hash value table of the original backup data, an identifier of a matched chunk whose hash value is the same as the calculated hash value of the current chunk, and incrementing a number of continuous matched chunks based on the exceeded threshold; and
  clearing the number of continuous matched chunks, whereby, the hash value table of the original backup data, and the identifier of a matched chunk whose hash value is the same as the calculated hash value of the current chunk are returned in response to the number of continuous matched chunks exceeding the threshold; and
  backing up remaining data after clearing the continuous matched chunks to one of the one or more computer-readable tangible storage devices.

7. The computer program product according to claim 6, wherein the method further comprises:
  in response to not exceeding the threshold, continuing to perform second chunking on the current data by using the same chunking method as that used by the original backup data to obtain a new current chunk; and
  calculating a hash value of the new current chunk.

8. The computer program product according to claim 7, wherein the method further comprises:
  acquiring a hash value of a next chunk of the matched chunk from the hash value table of the original backup data;
  comparing the hash value of the new current chunk with the hash value of the next chunk of the matched chunk;
  in response to the hash value of the new current chunk being the same as the hash value of the next chunk of the matched chunk:
    incrementing a number of continuous matched chunks;
    taking the next chunk of the matched chunk as a new matched chunk; and
    returning to the step of determining whether the number of continuous matched chunks exceeds a threshold;
  in response to the hash value of the new current chunk being different from the hash value of the next chunk of the matched chunk:
    clearing the number of continuous matched chunks; and
    returning to the step of acquiring, from the hash value table of the original backup data, an identifier of a matched chunk whose hash value is the same as the calculated hash value of the current chunk.

9. The computer program product according to claim 6, wherein the method further comprises:
  determining whether the number of continuous matched chunks exceeds a threshold, and in response to exceeding the threshold, acquiring a length of a data block corresponding to an identifier of a next chunk of the matched chunk.

10. The computer program product according to claim 9, wherein the method further comprises:
  continuing to perform a third chunking on the current data by using the acquired length of a data block corresponding to an identifier of a next chunk of the matched chunk to obtain a new current chunk;

calculating a hash value of the new current chunk;

acquiring a hash value of the next chunk of the matched chunk from the hash value table of the original backup data;

comparing the hash value of the new current chunk with the hash value of the next chunk of the matched chunk;

in response to the hash value of the new current chunk being the same as the hash value of the next chunk of the matched chunk:

taking the next chunk of the matched chunk as a new matched chunk; and returning to the step of acquiring an identifier of the next chunk of the matched chunk from a hash value table of the original backup data;

in response to the hash value of the new current chunk being different from the hash value of the next chunk of the matched chunk:

clearing the number of continuous matched chunks; and returning to the step of acquiring, from a hash value table of the original backup data, an identifier of a matched chunk whose hash value is the same as the calculated hash value of the current chunk.

* * * * *